United States Patent [19]

Jourdain et al.

[11] Patent Number: 5,116,218
[45] Date of Patent: May 26, 1992

[54] SEGMENTED HOT MOLDING APPARATUS

[75] Inventors: Gérard E. A. Jourdain, Saintry sur Seine; Régis Raynal, Montgeron, both of France

[73] Assignee: Societe Nationale d'Etude et de Construction de Moteurs d'Aviation "S.N.E.C.M.A.", Paris, France

[21] Appl. No.: 622,647

[22] Filed: Dec. 5, 1990

[30] Foreign Application Priority Data

Dec. 6, 1989 [FR] France .................... 89 16096

[51] Int. Cl.$^5$ .............................................. B29C 45/37
[52] U.S. Cl. ...................................... 425/547; 249/78; 249/144; 249/152; 249/170; 425/589; 425/451.9
[58] Field of Search ................... 249/78, 112, 134, 135, 249/144, 152, 153, 170, 179, 184; 425/577, 451.9, 547, 589

[56] References Cited

U.S. PATENT DOCUMENTS

| | | |
|---|---|---|
| 3,148,414 | 9/1964 | Boggs et al. |
| 3,801,059 | 4/1974 | Lippold ................... 249/134 |
| 4,761,130 | 8/1988 | Peters ................... 425/451.9 |
| 4,984,976 | 1/1991 | Kozachevsky et al. ......... 425/451.9 |

FOREIGN PATENT DOCUMENTS

| | | |
|---|---|---|
| 1980964 | 3/1968 | Fed. Rep. of Germany . |
| 2652862 | 4/1978 | Fed. Rep. of Germany . |
| 2613662 | 10/1988 | France . |
| 717802 | 11/1954 | United Kingdom . |
| 8801932 | 3/1988 | World Int. Prop. O. . |

*Primary Examiner*—Tim Heitbrink
*Attorney, Agent, or Firm*—Oblon, Spivak, McClelland, Maier & Neustadt

[57] ABSTRACT

Molding apparatus, for example for molding components of polymerized resin without drawing, comprises a mold defined by a mold wall having a first thermal expansion coefficient, and a die including a die wall having a second thermal expansion coefficient greater than the said first coefficient, a molding operation being carried out by inserting the die into the mold at a first temperature, heating the die and the mold to a second temperature higher than the first temperature, and subsequently cooling the die and the mold after a component has been molded. In accordance with the invention, the die wall includes a plurality of separate sectors which are pivotally mounted on a common support member and which are arranged and dimensioned such that, at the second temperature, the radially outer faces of the sectors adjoin one another contiguously to define the molding face of the die wall.

2 Claims, 2 Drawing Sheets

SEGMENTED HOT MOLDING APPARATUS

BACKGROUND OF THE INVENTION

1. Field of the Invention

The invention relates to molding apparatus, and is concerned with the problem of molding, from polymerized resins, components having an axis of revolution, without drawing when stripping, which would be unacceptable for high precision components, often also of large size.

2. Description of the Prior Art

One solution to this manufacturing problem is already known from FR-A-2,613,662, which discloses molding apparatus which has to be heat-treated, the apparatus comprising a mold defined by a mold wall possessing a first thermal expansion coefficient, and a die for cooperating with the mold, the die having a wall with a second thermal expansion coefficient greater than the first thermal expansion coefficient. A molding operation using this appratus involves inserting the die into the mold at a first temperature, then heating the die and the mold to a second temperature above said first temperature, and subsequently cooling the die and the mold after the component has been formed in the mould.

However, this known apparatus is both complicated and costly. It is complicated in that the die is made up of expansible elements, surrounded by a form of envelope which is also extensible and which constitutes the molding member of the die. Making the unit is not easy, and the molding accuracy obtained is not always satisfactory.

The apparatus is also costly, not only because of the presence of the envelope, but also because of the rapid wear which occurs and which necessitates frequent replacement of expensive elements.

SUMMARY OF THE INVENTION

The invention aims to obviate these drawbacks, on the one hand by simplifying the construction of the molding die and eliminating the envelope, and on the other hand by providing a constructional arrangement which permits the reuse of worn die elements after they have been remachined.

According to the invention, there is provided molding apparatus of the type which has to be heated, comprising a mold, said mold including a mold wall having a first thermal expansion coefficient, and a die arranged to cooperate with said mold, said die including a die wall having a second thermal expansion coefficient greater than said first thermal expansion coefficient, operation of said apparatus including the steps of inserting said die into said mold at a first temperature, heating the die and the mold to a second temperature higher than said first temperature, and subsequently cooling the die and the mold after a component has been molded, characterized in that said die comprises a support member and a plurality of separate sectors which are pivotally mounted on said support member, each of said sectors forming part of said die wall and having a radially outer face, the arrangement and dimensions of said sectors being such that, at said second temperature, said radially outer faces of said sectors adjoin each other contiguously to define the molding face of said die wall.

Preferably, each sector has a pivot axle and said support member has a plurality of seatings for receiving said pivot axle of each sector to define different mounting positions for said sector, whereby when said radially outer face of each sector has become worn, said face can be remachined and said sector remounted with said pivot axle thereof in a different seating such that, at said second temperature, said remachined face will occupy substantially the same position as was occupied by said face at said second temperature when the sector was in the first mounting position and before said face became worn and was remachined.

Further features and advantages of the invention will become apparent from the following description of a preferred embodiment, given by way of example, with reference to the accompanying drawings.

DESCRIPTION OF THE PREFERRED EMBODIMENTS

Figure 1:
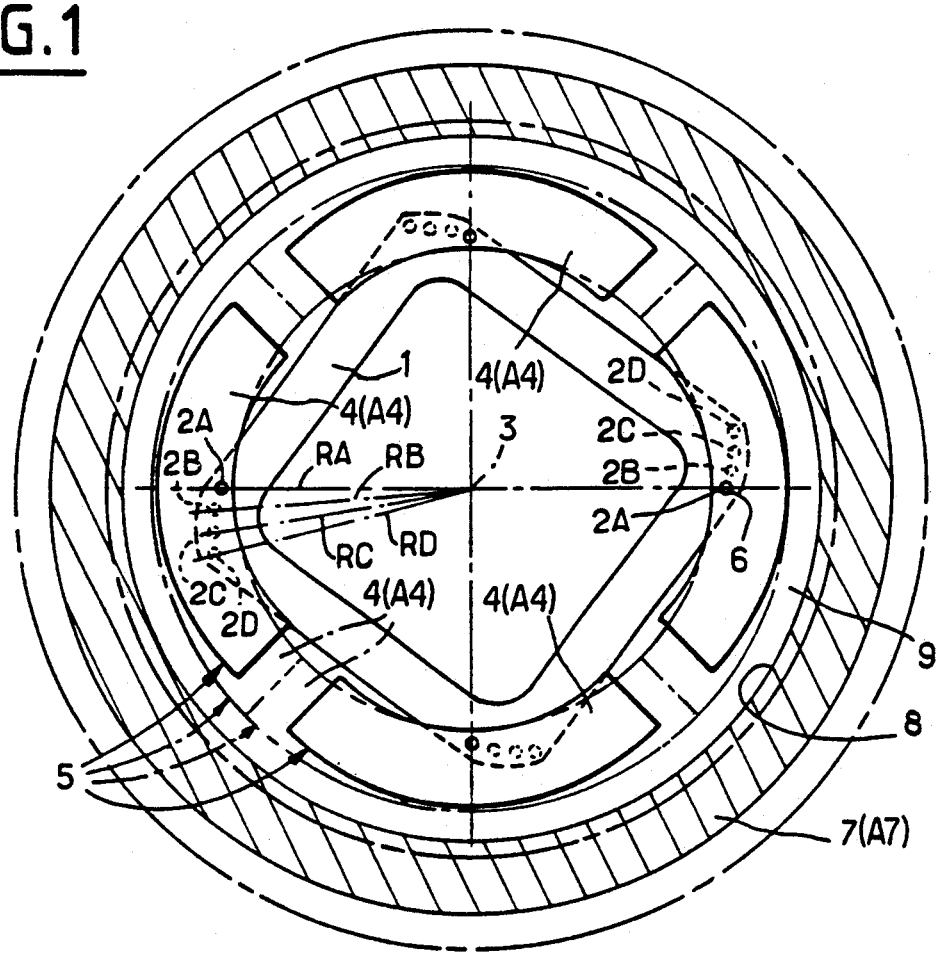
FIG. 1 is a diagrammatic sectional view of one embodiment of molding apparatus in accordance with the invention, showing the apparatus in two different configurations adopted at different temperatures.

The molding apparatus shown in FIG. 1 comprises:

- a support member 1 having an axis 3 and a cross section which is generally in the shape of a square and which has, in the region of each corner, a set of four seatings 2A, 2B, 2C and 2D for receiving a pivot axle, these seatings being set at increasing distances RA, RB, RC and RD from the axis 3;
- four identical sectors 4 which are pivotally mounted on the support 1, one at each corner, by pivot axles 6 parallel to the axis 3 and received in seatings in the sectors and one of the seatings 2A–2D of the support, e.g. the seatings 2A as illustrated in FIG. 1, each sector having a partly cylindrical radial outer face 5 with a generatrix parallel to the axis 3; and
- a mold 7 which has a cylindrical inner wall 8 coaxial with the axis 3.

The assembly comprising the support 1 and the four sectors 4 constitutes a second mold die, and the space 9 between the mold wall 8 and the die corresponds to the volume of the component to be molded.

An important feature of the invention is that the thermal expansion coefficients A4 and A7 of the sectors 4 and of the mold 7 are different, the coefficient A4 of the sectors being greater than the coefficient A7 of the mold.

In FIG. 1, the continuous lines show the apparatus in the configuration at an initial temperature T0, whereas the broken lines show the configuration adopted at a final temperature T1, greater than T0. During operation, the molding apparatus is heated from temperature T0 to temperature T1, for example by means of electrical resistors contained in the mold 7 and the sectors 4, and is subsequently cooled back down to the temperature T0.

It will be noted that whereas each sector is separated from its neighbors at the initial temperature T0, this is not the case at the final temperature T1, at which the various sectors 4 meet together to constitute the continuous wall of the die with the outer faces 5 of the sectors joining contiguously to form the molding face of the die.

The material of the component which is to be molded in the space 9 should have a thermal expansion coefficient on the same order of magnitude as that of the mold 7 and that of the support 1.

Figure 2:
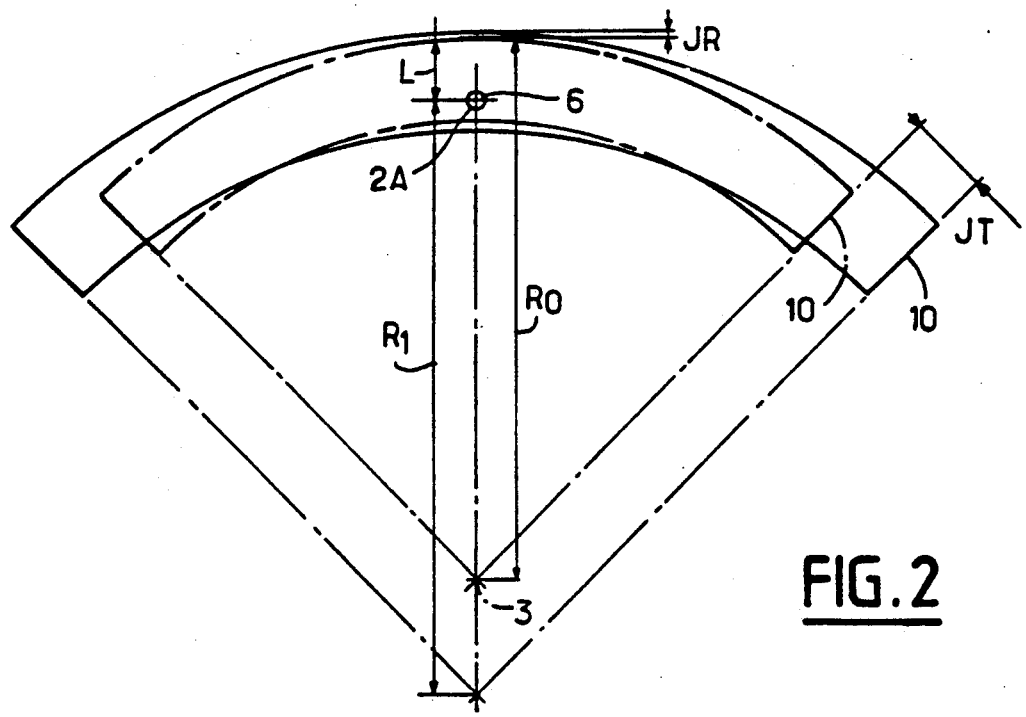
FIG. 2 if an end view of one of the die sectors indicating dimensions of the sector in the two configurations shown in FIG. 1.

FIG. 2 shows a sector 4 at the above-mentioned two temperatures, having the following measurements:

L = the distance between the axis of the seating 2A and the outer face 5 of the sector 4, at temperature TO, measured along a radius passing through the axis 3;

R0 = the radial distance between the axis 3 and the face 5 of the sector;

R1 = the radial distance between the axis of the seating 2A and the position of the axis 3 at temperature Tl;

JR = the radial displacement of the face 5 along the radius passing through the axis of the seating 2A, during expansion of the sector 4 between the temperatures TO and Tl;

JT = the tangential displacement of one end 10 of the sector 4, during expansion of the sector between the temperatures TO and Tl;

DT = Tl − TO;

$\pi = 3.14159$;

N = the number of sectors (in the present embodiment four).

The values of JR and JT are obtained using the following formulae;

$$JR = L \times A4 \times DT$$

$$JT = (\pi \times RO \times A4 \times DT)/N.$$

Naturally, the number of sectors is not restricted to 4, and may differ (being either more or less than 4).

Figure 3:
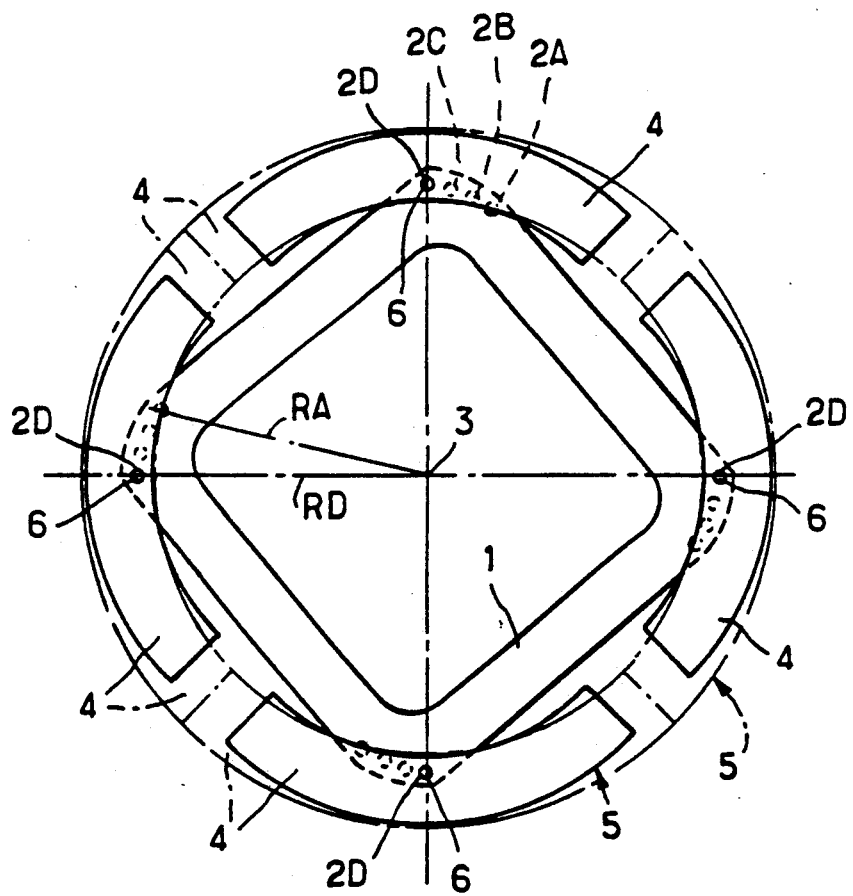
FIG. 3 shows the die of FIG. 1 in substantially the same configurations, but in the case where the die sectors have been remachined and remounted in different positions after having become worn.

FIG. 3 shows the same die as in FIG. 1, but with each sector 4 remounted with its pivot axle 6 in the corresponding seating 2D of the support 1, after the sectors have become worn and have had their outer faces 5 remachined.

Taking into account the difference between the distances RA and RD, the new face 5 of each sector is located, at temperature TO, in substantially the same place as the original face 5, and, at temperature Tl, the new faces 5 of all the sectors together occupy exactly the same position as the original faces 5 before becoming worn and remachined. The capability of the die for molding is thus entirely restored by the remachining and the remounting in the seatings 2D instead of the seatings 2A. Naturally, this result is also obtained through the partial remachining and the remounting of the pivot axles 6 in either of the intermediate seatings 2B and 2C.

Thus, with the arrangement described it is possible, by selecting the expansion coefficients A4 and A7:

to achieve, at the temperature Tl, a continuous outer face of the die solely by sectors 4 themselves, without the interposition of an intermediate envelope; and, to reuse the same sectors several times, by partial remachining and remounting after becoming worn. The sectors are costly items, and there is an obvious interest in being able to use them as long as possible.

In the case of the components to be molded, which will generally be axisymmetrical, especially cylindrical, the difference between the thermal expansion coefficients A4 and A7 permits very precise moldings, since they do not require any drawing.

It is to be noted that the rise in temperature from TO to Tl of both the mold 7 and the die sectors 4 allows a homogeneous hot polymerization of the composite resins from which the components to be molded are made. However, the apparatus described is not restricted to use for molding components from hot polymerizable resins. Any hot molding without drawing can be obtained with the apparatus.

It will, of course, be appreciated that the invention is not limited to the embodiment described, but covers all possible alternatives which could be used without departing either from the scope or the spirit of the invention as defined by the following claims.

We claim:

1. A molding apparatus, which comprises:
   a first die, said first die having a die wall with a first thermal expansion coefficient;
   a second die surrounded by said first die, said second die having a die wall with a second thermal expansion coefficient greater than said first thermal expansion coefficient, said die wall of said second die being separated from and facing opposite said die wall of said first die so as to form a mold cavity, wherein said second die comprises a support member and a plurality of separate sectors which are pivotally mounted on said support member, each of said sectors having a radial outer face forming part of the die wall of the second die; and
   means for heating said first and second dies, said sectors being dimensioned and arranged such that when heated by said heating means said radial outer faces of said sectors adjoin each other contiguously to define the wall of the second die.

2. Molding apparatus according to claim 1, wherein each sector has a pivot axle and said support member has a plurality of seatings for receiving said pivot axle of each sector to define different mounting positions for each sector, whereby when said radially outer face of each sector has become worn, each face can be remachined and each sector remounted with said pivot axle thereof in a different seating such that, when each sector is heated, each remachined face will occupy substantially the same position as before each face became worn and was remachined.

* * * * *